US010826689B2

(12) United States Patent
Oliver et al.

(10) Patent No.: US 10,826,689 B2
(45) Date of Patent: *Nov. 3, 2020

(54) SECURELY STORING DATA IN A DATA STORAGE SYSTEM

(71) Applicant: Microsoft Technology Licensing, LLC, Redmond, WA (US)

(72) Inventors: David Charles Oliver, Bellevue, WA (US); Ming-wei Wang, Bellevue, WA (US); Mingquan Xue, Redmond, WA (US); Christopher Paul Holder, Redmond, WA (US); Daniel Keith Winter, Monroe, WA (US); Parul Manek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/036,035

(22) Filed: Jul. 16, 2018

(65) Prior Publication Data
US 2019/0081775 A1 Mar. 14, 2019

Related U.S. Application Data

(63) Continuation of application No. 14/874,125, filed on Oct. 2, 2015, now Pat. No. 10,050,780.
(Continued)

(51) Int. Cl.
*H04L 9/08* (2006.01)
*G06F 21/62* (2013.01)
(Continued)

(52) U.S. Cl.
CPC ............ *H04L 9/0822* (2013.01); *G06F 3/064* (2013.01); *G06F 3/065* (2013.01); *G06F 3/0619* (2013.01); *G06F 3/0683* (2013.01); *G06F 11/1004* (2013.01); *G06F 21/602* (2013.01); *G06F 21/6209* (2013.01); *G06F 21/6218* (2013.01);
(Continued)

(58) Field of Classification Search
CPC ..... H04L 9/0822; H04L 9/0894; H04L 63/06; H04L 63/064; H04L 2463/062; G06F 21/6209; G06F 21/6218
See application file for complete search history.

(56) References Cited

U.S. PATENT DOCUMENTS 4,317,957 A * 3/1982 Sendrow ................ G06Q 20/02
235/379
4,503,287 A * 3/1985 Morris ...................... H04L 9/14
380/259

(Continued)

OTHER PUBLICATIONS

Li et al. "Secure Deduplication with Efficient and Reliable Convergent Key Management", IEEE Transactions on Parallel and Distributed Systems, IEEE Service Center, vol. 25, No. 6. Jun. 1, 2014. 12 pages (Year: 2014).*

*Primary Examiner* — Zachary A. Davis
(74) *Attorney, Agent, or Firm* — Christopher J. Volkmann; Kelly, Holt & Christenson, PLLC

(57) ABSTRACT

A data file is encrypted with a file-specific encryption key and sent to a remote data storage system. The file-specific encryption key is encrypted with a master key. The encrypted file-specific encryption key and the master key are both stored remotely from the encrypted file and they are stored remotely from one another.

14 Claims, 12 Drawing Sheets

Related U.S. Application Data

(60) Provisional application No. 62/155,886, filed on May 1, 2015, provisional application No. 62/155,975, filed on May 1, 2015.

(51) Int. Cl.
  *G06F 11/10* (2006.01)
  *G06F 3/06* (2006.01)
  *G06F 21/64* (2013.01)
  *G06F 21/60* (2013.01)
  *H04L 29/06* (2006.01)

(52) U.S. Cl.
  CPC ............ *G06F 21/64* (2013.01); *H04L 9/0894* (2013.01); *H04L 63/064* (2013.01); *H04L 2463/062* (2013.01)

(56) References Cited

U.S. PATENT DOCUMENTS

| | | | | |
|---|---|---|---|---|
| 4,731,840 A | * | 3/1988 | Mniszewski | H04L 9/0625 380/262 |
| 4,941,176 A | * | 7/1990 | Matyas | G06F 9/30018 380/277 |
| 5,940,507 A | * | 8/1999 | Cane | G06F 21/6245 380/277 |
| 7,237,268 B2 | * | 6/2007 | Fields | G06F 21/606 709/203 |
| 7,801,871 B2 | * | 9/2010 | Gosnell | G06F 21/6209 707/698 |
| 8,621,196 B2 | * | 12/2013 | Pasam | G06F 21/575 713/189 |
| 8,862,889 B2 | * | 10/2014 | Madden | G06F 21/6218 713/179 |
| 8,879,727 B2 | * | 11/2014 | Taylor | H04L 9/0618 380/37 |
| 9,397,832 B2 | * | 7/2016 | Androulaki | G06F 16/00 |
| 9,397,833 B2 | * | 7/2016 | Androulaki | G06F 12/1408 |
| 9,628,268 B2 | * | 4/2017 | Kiang | H04L 9/0822 |
| 10,050,780 B2 | * | 8/2018 | Oliver | G06F 11/1004 |
| 2013/0042106 A1 | * | 2/2013 | Persaud | G06F 21/606 713/165 |
| 2014/0270178 A1 | * | 9/2014 | Kiang | H04L 9/0822 380/281 |

* cited by examiner

SECURELY STORING DATA IN A DATA STORAGE SYSTEM

CROSS-REFERENCE TO RELATED APPLICATIONS

The present application is a continuation of and claims priority of U.S. patent application Ser. No. 14/874,125, filed Oct. 2, 2015, which is based on and claims the benefit of U.S. provisional patent application Ser. No. 62/155,886 filed May 1, 2015, and U.S. provisional patent application Ser. No. 62/155,975 filed May 1, 2015, the content of these applications is hereby incorporated by reference in their entirety.

BACKGROUND

Computer systems are currently in wide use. Some computer systems use remotely located services to accomplish a variety of different things. The remotely located services, for instance, can provide remote data storage for a client.

A cloud service provider that provides such a service generally stores customer data remotely from the premises of the customer and provides one or more services relative to the data. Examples of such cloud services include remote file storage and sharing, electronic mail, hosted applications, etc.

For many customers of the cloud services, such as corporations or other organizations, sensitive and/or confidential information may be stored remotely from the corporation's physical facility. Thus, for some customers of the cloud service, it is important that access to any of the customer's data be strictly controlled. For instance, it may be that customers of cloud services wish to have visibility into actions taken on their content, and wish to have control over access to their content in the cloud, in order to trust the cloud service provider.

In addition, it can be difficult for some organizations that use cloud services to trust that, when a client asks for data to be deleted from the storage system (which is hosted by a third party), it is actually going to be deleted from both hard drive and backup systems within the third party's storage system. On some systems, orphan copies of the data may remain for unknown periods of time, without the knowledge of the client. This data can be compromised when the third party storage system is subjected to surreptitious attack.

Further, users of cloud storage services often wish to verify that data is properly written. This can be quite difficult, and can often consume local storage resources, such as local caching of data.

The discussion above is merely provided for general background information and is not intended to be used as an aid in determining the scope of the claimed subject matter.

SUMMARY

A data file is encrypted with a file-specific encryption key and sent to a remote data storage system. The file-specific encryption key is encrypted with a master key. The encrypted file-specific encryption key and the master key are both stored remotely from the encrypted file and they are stored remotely from one another.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
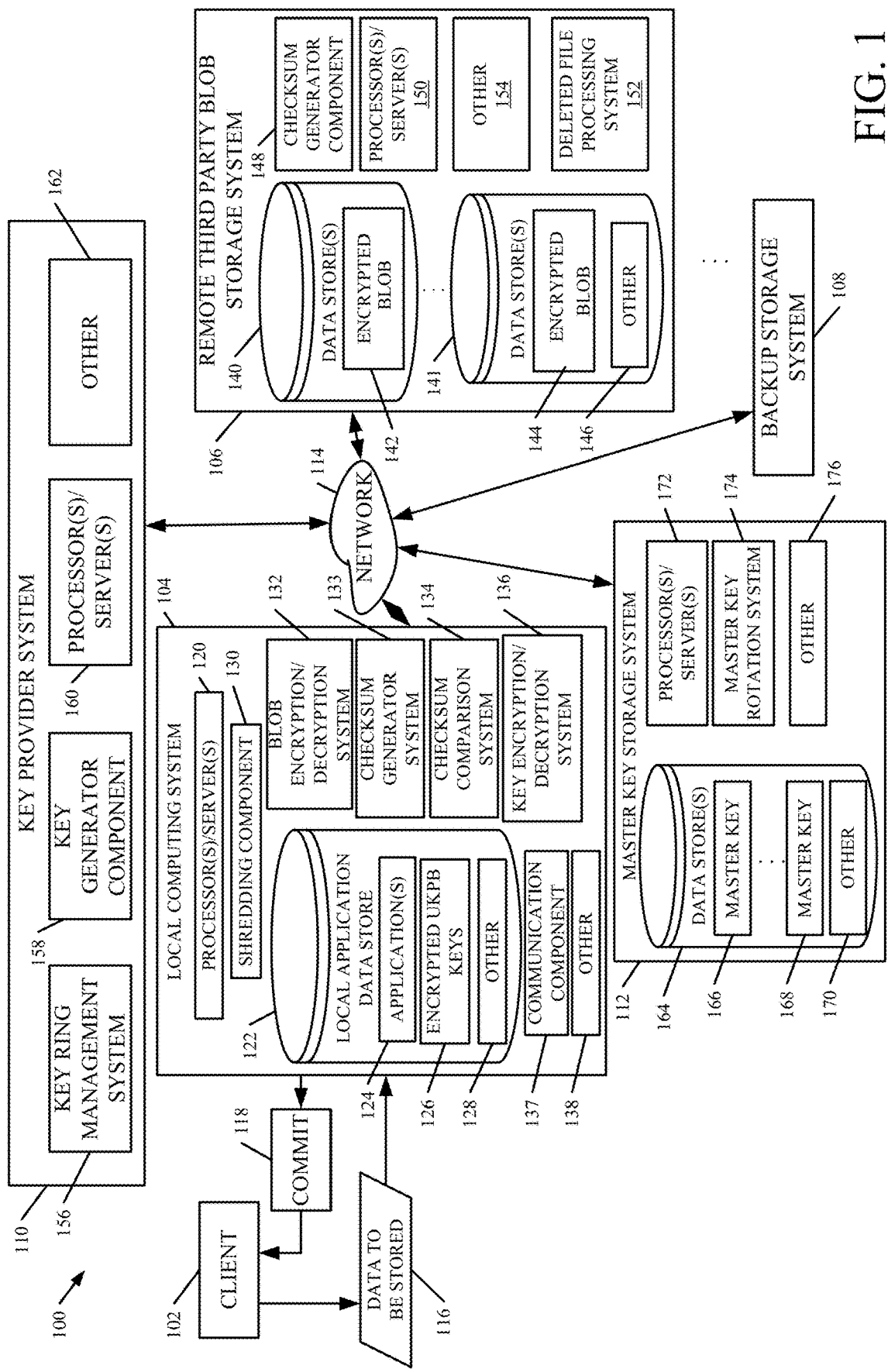
FIG. 1 is a block diagram of one example of a data storage architecture.

FIG. 1 is a block diagram of one example of a data storage architecture 100. Architecture 100 illustratively includes one or more clients 102 that interact with local computing system 104. Client(s) 102 can interact with systems 104 in order to store information on a remote third party blob storage system 106 and on one or more backup storage systems 108. It will be noted that backup storage system 108 can be a remote third party blob storage system similar to that shown at 106, or it can be different.

FIG. 1 also shows that, in one example, architecture 100 includes a key provider system 110 and a master key storage system 112. Systems 104, 106, 108, 110, and 112 illustratively communicate with one another over a network 114.

In one example, client 102 can provide a data stream (e.g., a file) 116 to local computing system 104 which prepares data stream 116 for storage on system 106, and provides data stream 116 to system 106 for storage. Local computing system 104 also validates that the file 116 has been accurately written to system 106 (and system 104 may also verify that file 116 has been accurately stored on backup system 108) and then provides a commit response 118 to client 102 indicating that the write has been successful. In doing so, system 104 can use key provider system 110 and master key storage system 112, among other things.

In the example shown in FIG. 1, local computing system 104 illustratively includes a set of processors or servers 120, and a local application data store 122. Data store 122 stores applications 124, a set of encrypted unique key per blob (UKPB) keys 126, and can store other items 128. System 104 also illustratively includes shredding component 130, per blob encryption/decryption system 132, checksum generator system 133, comparison system 134, key encryption/decryption system 136, communication component 137, and can include a variety of other items 138. FIG. 1 also shows that, in one example, remote third party blob storage system 106 illustratively includes one or more data stores 140-141 that store a set of encrypted blobs 142-144, and that can include other items 146 as well. System 106 also illustratively includes a checksum generator component 148, one or more processors and servers 150, deleted file processing system 152, and can include other items 154.

In addition, FIG. 1 also shows that, in one example, key provider system 110 includes key ring management system 156, key generator component 158, one or more processors or servers 160, and can include other items 162. Master key storage system 112 illustratively includes one or more data stores 164 that store a set of master keys 166-168, and that can store other items 170. System 112 also includes one or more processors or servers 172, master key rotation system 174, and can include other items 176.

Before describing the overall operation of architecture 100, a brief overview of its operation and some of the items in architecture 100, will first be provided. When local computing system 104 receives data 116 from client 102, for storage on system 106, shredding component 130 illustratively splits the file into a plurality of different blobs. It will be noted that, while shredding splits the file on a letter or word basis, the present discussion also includes chunking which splits the file on a paragraph basis. Both types of splitting, or others, can be used as well. Per blob encryption/decryption system 132 obtains an encryption key from key generator component 158 in key provider system 110 and encrypts each blob with its own encryption key. The key provider system 110 can be a standalone service or endpoint, or arranged in another way. Checksum generator system 133 generates a checksum for the pre-encrypted value of the blob and for the post-encryption value of the blob. In one example, the checksum is a message digest (MD) 5 checksum although others can be used as well. System 104 then sends the encrypted blob to system 106 for storage. System 106 writes the encrypted blob to one of data stores 140-141. The different blobs for a file are illustratively stored across different data stores 140-141 and even across different systems 106-108. Checksum generator component 148 generates a post-write checksum for the encrypted blob, after it is written on a data store 140-141, and provides that checksum back to local computing system 104. Checksum comparison system 134 compares the post-encryption checksum generated by system 133 and the post-write checksum generated by component 148 to ensure that they are the same. If they are, system 104 can provide commit 118 back to client 102. In one example, system 104 can perform the same operations with respect to backup storage system 108 to ensure that the encrypted blob is also accurately written to backup storage system 108, before it provides commit 118 to client 102.

In another example, a checksum of the initial non-encrypted file can be generated and then after it is written into the remote storage system, computing system 104 can go through the entire retrieval and decryption process and validate that the resulting file was the same as the initial file before considering the commit to be complete. This may take more time and network resources to accomplish, but may be more precise.

Key encryption/decryption system 136 also illustratively obtains a master key from key provider system 110 and encrypts the UKPB key used to encrypt the blobs sent to system 106 for storage. The encrypted UKPB keys 126 are then stored on local application data store 122. The master keys are then deleted from system 104, but are provided to master key storage system 112 for storage.

In one example, systems 104, 106, 108 and 112 are all in separate physical and geographic locations. Also, in one example, the rights to different information are separated. For example, system 104 is unable to enumerate files that are stored in system 106. Thus, if access to systems 112 and 106 were obtained maliciously, this only means that specific parts of specific files that are already known can be obtained. A scan for other files cannot be done. Also having control of system 104 only means that what one already knows about is what could be retrieved. Each local computing system component has its own set of keys with the locations they map to. They are not aware of each other's data. Therefore, for a surreptitious user to obtain an unencrypted copy of any files 116 that are stored on storage system 106, that user must have access not only to the encrypted UKPB keys 126 on system 104, but the user must also have access to the master keys on master key storage system 112, and to the encrypted blob itself, which is stored on storage system 106. Thus, the surreptitious user must have access to three disparate systems, and a knowledge of how to use the master key, encrypted UKPB keys and encrypted blob, in order to gain access to an unencrypted form of the data.

Deleted file processing system 152 can also process files where a request has been received in order to delete those files. Architecture 100 also ensures that, after a desired amount of time, deleted files are no longer recoverable. This involves using the keyring management system 156 to obtain a key that will expire within a predefined amount of time, and this is described in greater detail below with respect to FIG. 5.

Figure 2A:
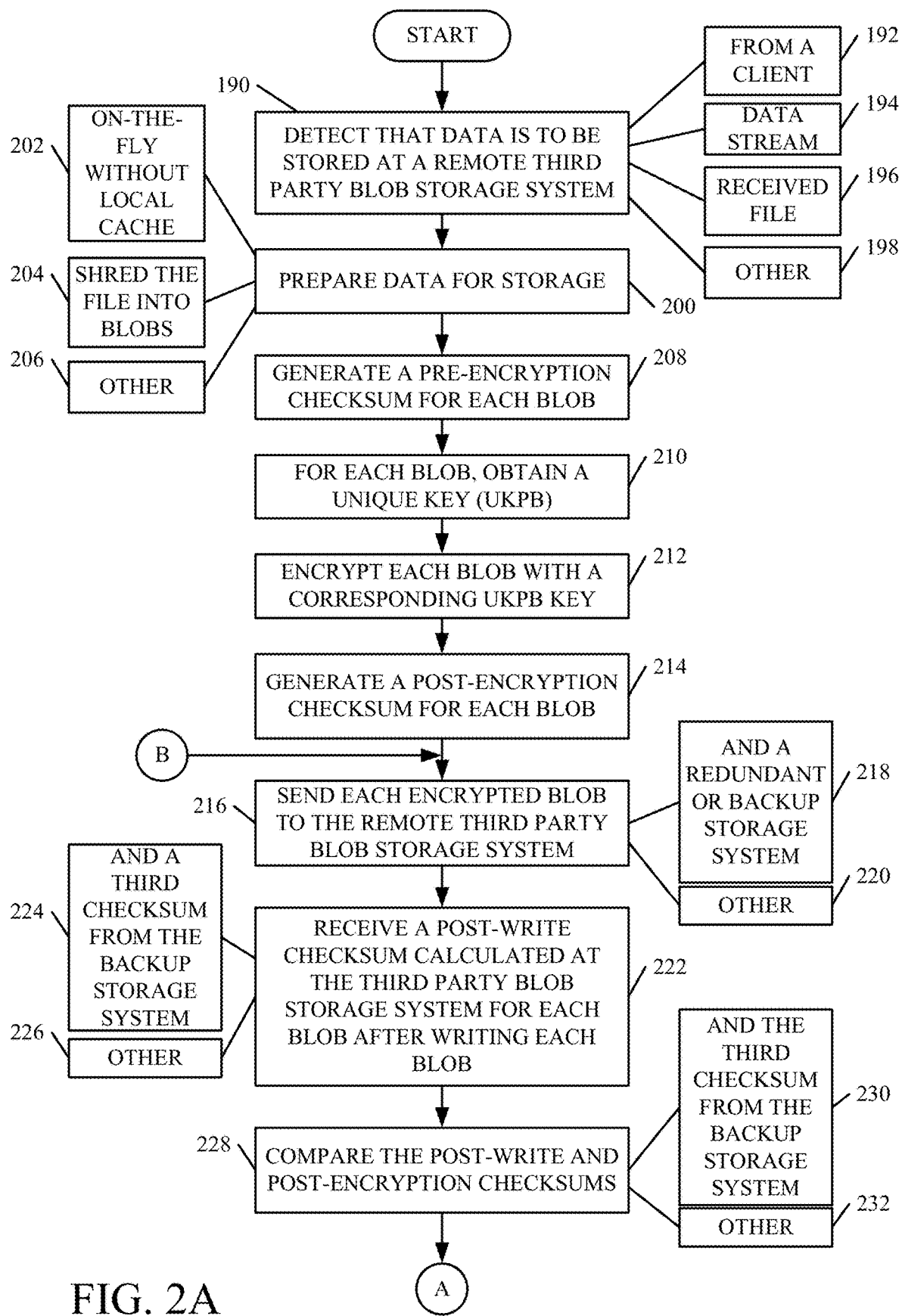
FIGS. 2A and 2B (collectively referred to herein as FIG. 2) show a flow diagram illustrating one example of the operation of the architecture shown in FIG. 1 in storing data.
Figure 2B:
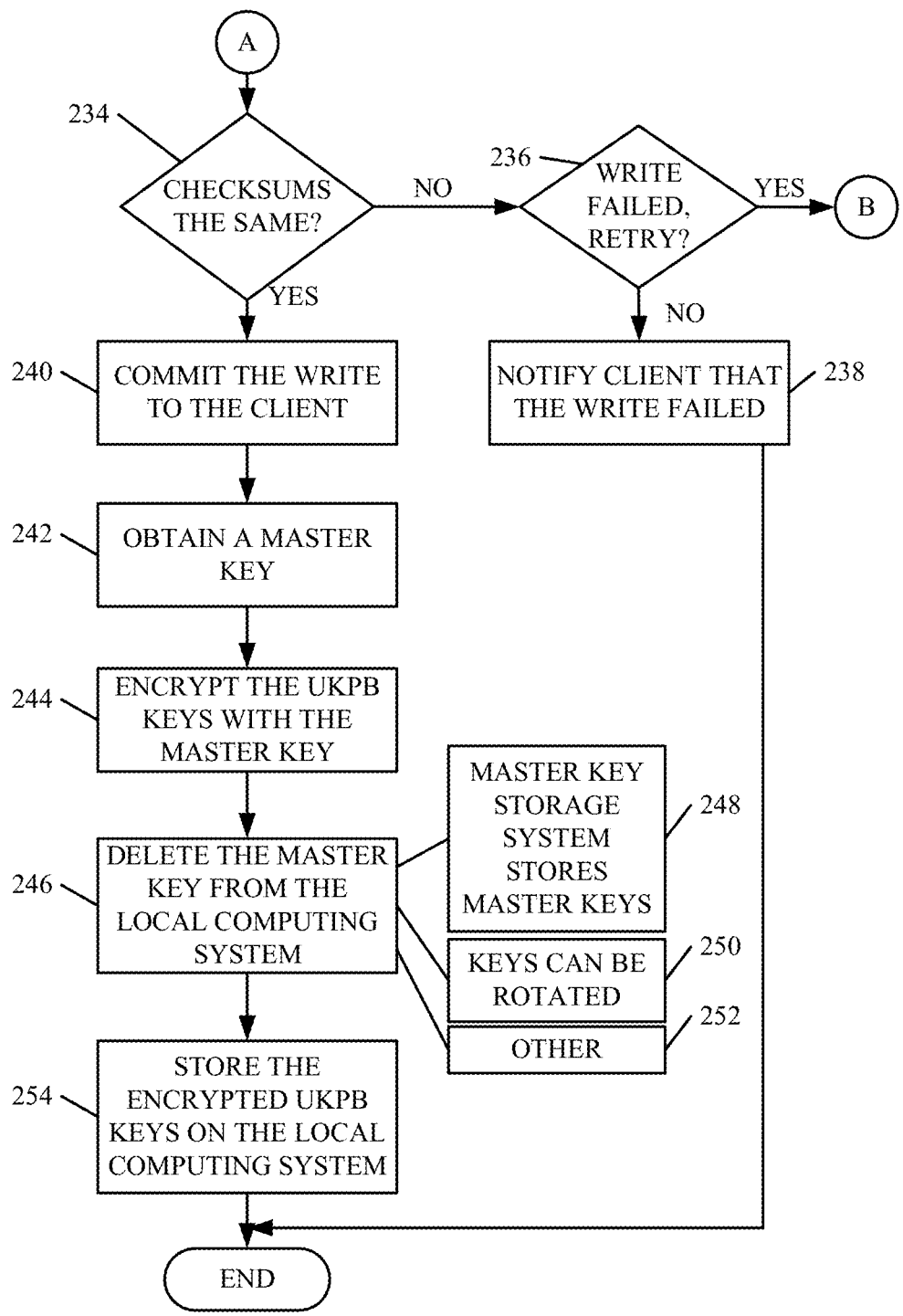

FIGS. 2A and 2B (collectively referred to herein as FIG. 2) illustrate a flow diagram showing one example of the operation of architecture 100 in encrypting and storing data at remote third party blob storage system 106. Communication component 137 in local computing system 104 first detects that data is to be stored on storage system 106. This is indicated by block 190 in FIG. 2. Component 137 can detect an input from a client 102, as indicated by block 192. The data can be a data stream 194, a received file 196 (or other data 198) and a request to store file 196 on remote third party system 106.

System 104 then prepares the data for storage on system 106. This is indicated by block 200. In one example, the preparation is performed on-the-fly, as indicated by block 202. For instance, shredding component 130 illustratively divides the received file 116 into blobs of data, as it is received. Again, this can include a variety of kinds of splitting, such as chunking or shredding or other splitting. This is indicated by block 204. System 104 can perform other preparation operations as well, as indicated by block 206.

Checksum generator system 133 then generates a pre-encryption checksum for each blob, as it is being processed. This is indicated by block 208, and it can be used when decrypting to validate a file, but is not used to validate the transfer of the file into systems 106 or 108. For each blob, encryption/decryption system 132 obtains a UKPB key from key generator component 158 in key provider system 110. This is indicated by block 210 in FIG. 2. Again, system 110 need not be a standalone service or endpoint. System 132 then encrypts each blob with a corresponding UKPB key. This is indicated by block 212 in FIG. 2. Checksum generator system 133 then generates a first post-encryption checksum for each blob. This is indicated by block 214.

Communication component 137 then sends each encrypted blob to the remote third party blob storage system 106. This is indicated by block 216. It will be noted that communication component 137 can also send the encrypted blob to a redundant or backup storage system 108. This is indicated by block 218. Communication component 137 can provide the data to other locations as well, as indicated by block 220.

Remote third party blob storage system 106 then receives the encrypted blob, writes it to data store 140 and generates a post-write checksum for it. The operation of system 106 is described in greater detail below with respect to FIG. 3.

Checksum comparison system 134 then receives the post-write checksum that is calculated by checksum generator component 148 on the third party blob storage system 106. This is indicated by block 222 in FIG. 2. Checksum comparison system 134 can also receive any other checksums that are generated by any other backup storage systems 108. This is indicated by block 224. Checksum comparison system 134 can receive other values generated from other systems as well, as indicated by block 226.

Comparison system 134 then compares the post-encryption checksum generated by checksum generator system 133 on local computing system 104 against the post-write checksum generated by component 148 on storage system 106, after the encrypted blob has been written to data store 140. This is indicated by block 228 in FIG. 2. Comparison system 134 can also compare the checksum generated by local computing system 104 against other post-write checksums generated by other backup storage systems 108. This is indicated by block 230. Comparison system 134 can compare the values to other items as well, and this is indicated by block 232.

If the checksums are not the same, this means that the write operation to write the encrypted blob to a data store 140-141 or to system 108, has failed. Determining whether the checksums are the same is indicated by block 234 in FIG. 2. System 104 then determines whether any retries are to be attempted, as indicated by block 236. If not, client 102 is notified that the write failed, as indicated by block 238. In another example, before notifying the client of a write failure, the system can fall back to writing the file into a local cache and retry the whole process later on a timer interval until it succeeds. In such an example, the client 102 is notified if both the commits to systems 106 and 108 and the commit to the local cache all failed. However, if, at block 236, the system is to retry writing the blob to storage system 106, then processing reverts to block 216 where the encrypted blob is again sent to the remote third party blob storage system 106.

If, at block 234, checksum comparison system 134 determines that the post-encryption checksum generated on local computing system 104 is the same as the post-write checksum generated by component 148 in third party storage system 106, then it can send commit 118 to client 102 indicating that the write has been successful. This is indicated by block 240 in FIG. 2. Also, system 104 can wait to send the commit 118 until both the post-write checksum generated by third party storage system 106 and the post-write checksum generated by backup storage system 108 are compared and found to be the same as the post-encryption checksum generated by system 104. All of these architectures are contemplated herein.

At some point in the processing, key encryption/decryption system 136 obtains a master key from key provider system 110. This is indicated by block 242 in FIG. 2. It then encrypts the UKPB keys that were used to encrypt the blobs sent to storage system 106 (and storage system 108), with the master key. This is indicated by block 244. It then sends the master key to master key storage system 112, where the master key is stored in data store 164, without keeping any copies of the master key on local computing system 104. Deleting the master key from the local computing system 104 is indicated by block 246, and storing the master key on master key storage system 112 is indicated by block 248.

It will also be noted that, in one example, the master keys can be rotated according to a system employed by master key rotation system 174. Rotating the master keys provides even another level of security to the information stored in architecture 100. Rotating the keys is indicated by block 250. The master keys can be processed in other ways as well, as indicated by block 252.

Key encryption/decryption system 136 then stores the encrypted UKPB keys 126 in local application data store 122. This is indicated by block 254 in FIG. 2. It can thus be seen that, in one example, the encrypted data, the encrypted keys, and the master keys are all needed to decrypt the data and are all stored at geographically separate locations (or facilities).

Figure 3:
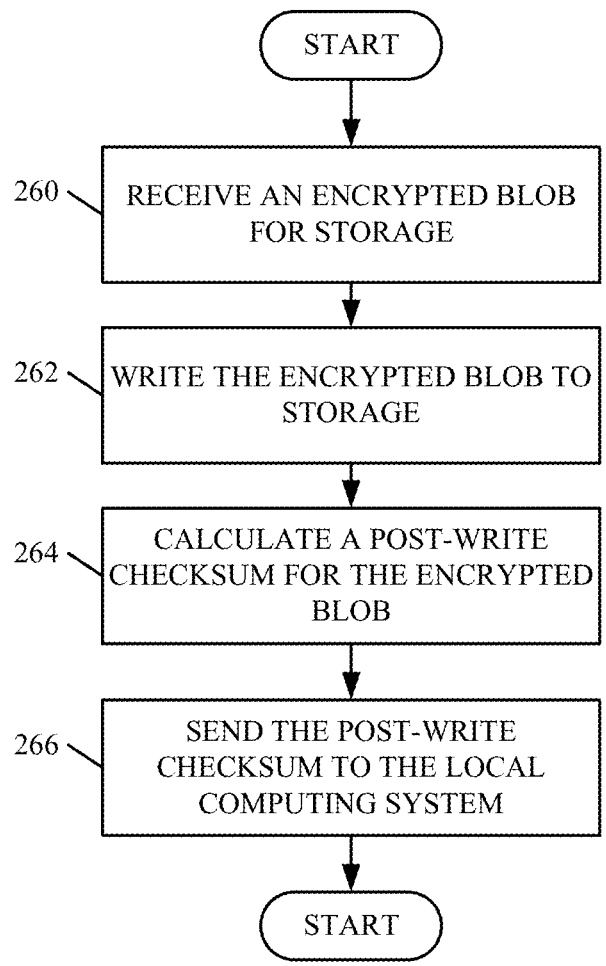
FIG. 3 is a flow diagram illustrating one example of the operation of a third party storage system in storing data.

FIG. 3 is a flow diagram illustrating one example of the operation of remote third party blob storage system 106 in receiving and storing an encrypted blob on data store 140. System 106 first receives an encrypted blob for storage. This is indicated by block 260 in FIG. 3. It then writes the encrypted blob to data store 140. This is indicated by block 262. Checksum generator component 148 then calculates a post-write checksum for the encrypted blob that it has just written to data store 140. This is indicated by block 264. It then sends the post-write checksum to the local computing system 104 from which it received the encrypted blob. This is indicated by block 266.

Figure 4:
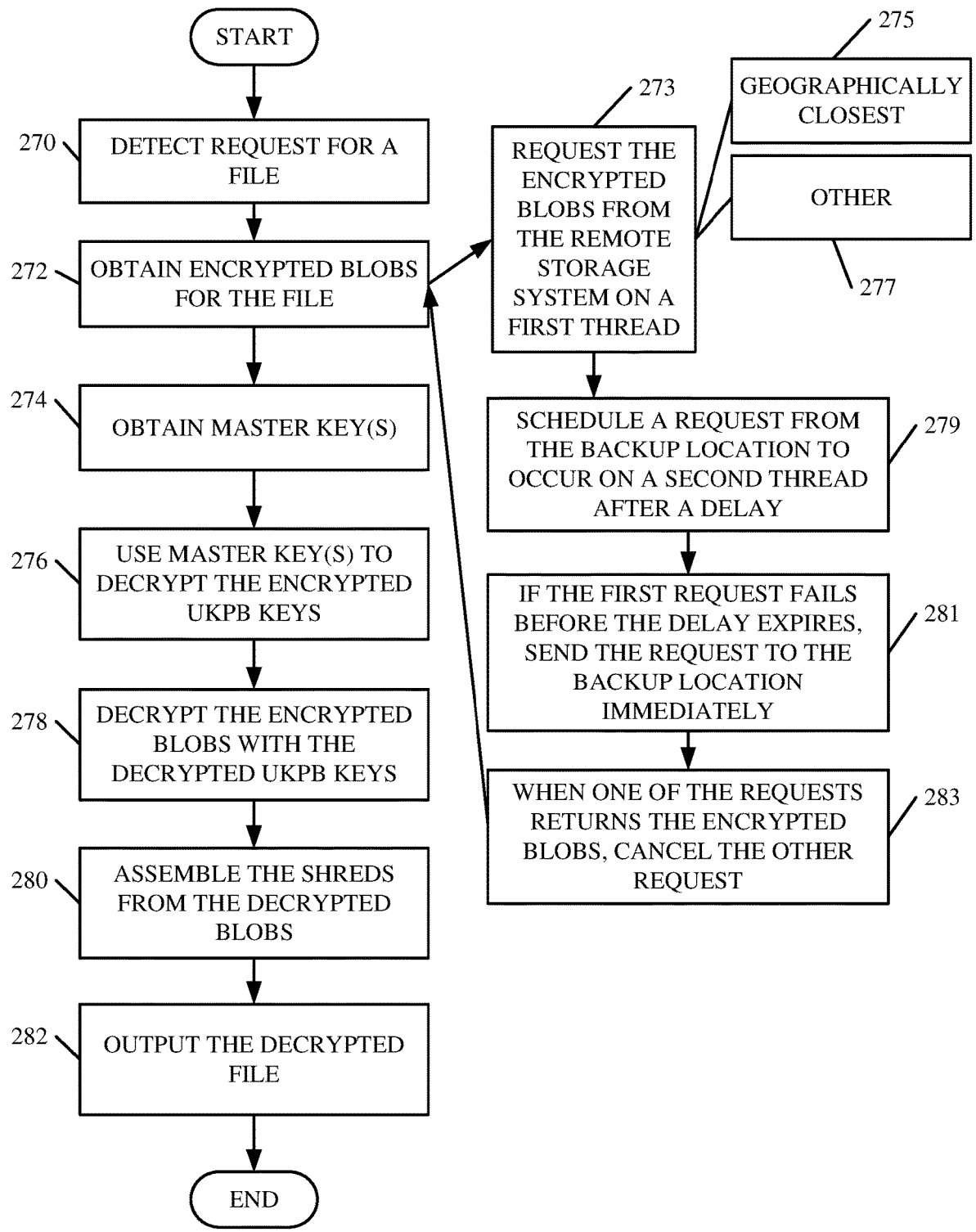
FIG. 4 is a flow diagram illustrating one example of the operation of a local computing system in receiving and decrypting data.

FIG. 4 is a flow diagram illustrating one example of the operation of local computing system 104 in receiving and decrypting a file (or encrypted blob) from third party blob storage system 106. Communication component 137 in local computing system 104 first detects a request to access a file. This is indicated by block 270. In one example, for instance, client 102 may provide a data access request to access a file that is stored on storage system 106.

In response, blob encryption/decryption system 132 then obtains the encrypted blobs for the requested file, from storage system 106. This is indicated by block 272. This can be done in a variety of different ways. In one example, component 137 requests the encrypted blob from one of the storage systems 106 and 108 on a first computing thread. This is indicated by block 273. The request may be sent to the geographically closest system 106 or 108, as indicated by block 275, or to another system, as indicated by block 277. At the same time, component 137 schedules a second request to be sent, after a delay period, on a second computing thread, to the other storage system (e.g., to system 108 if the first request is sent to system 106). This is indicated by block 279. If the first request fails, component 137 immediately sends the second request, without waiting for the delay period. This is indicated by block 281. The two threads can illustratively cancel one another. Therefore, as soon as the results are returned on one thread, the other thread is canceled. This is indicated by block 283. The encrypted blobs can be obtained in other ways as well.

System 132 also obtains the master key stored on data store 164, for master key storage system 112, that was used to encrypt the UKPB keys 126 that were, themselves, used to encrypt the blobs corresponding to the requested file. Obtaining the master key or keys is indicated by block 274. Key encryption/decryption system 136 then uses the master key to decrypt the encrypted UKPB keys 126. This is indicated by block 276. Once the keys are decrypted, blob encryption/decryption system 132 uses the UKPB keys to decrypt the blobs associated with the requested file. This is indicated by block 278. It then assembles the decrypted shreds (or blobs) and outputs the decrypted file to the requesting client 102. Assembling the shreds from the decrypted blobs is indicated by block 280, and outputting the decrypted file to client 102 is indicated by block 282.

Figure 5A:
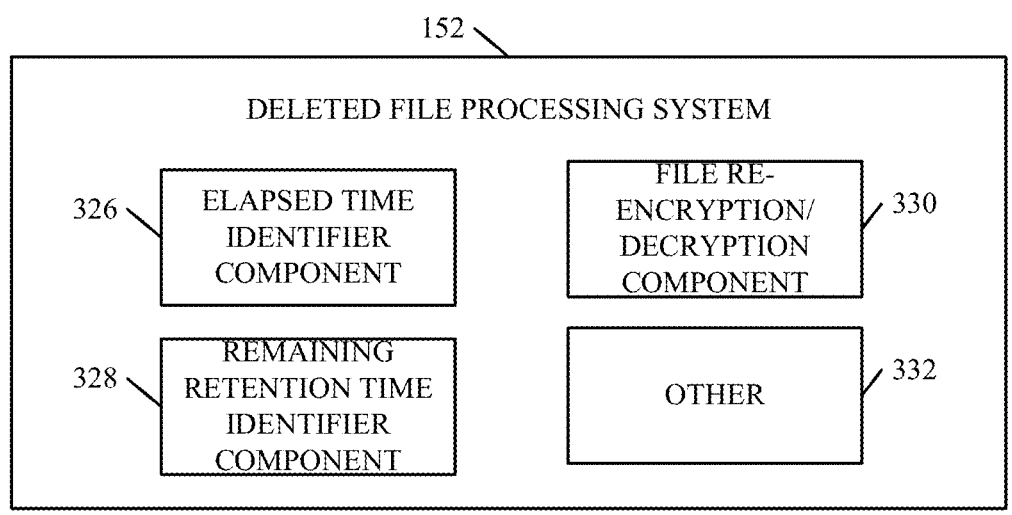
FIG. 5A is a more detailed block diagram of one example of a deleted file processing system.

FIG. 5A shows one example of a more detailed block diagram of deleted file processing system 152. System 152 illustratively includes an elapsed time identifier component 326. It also illustratively includes remaining retention time identifier component 328, file re-encryption/decryption component 330, and it can include a variety of other items 332 as well.

Figure 5B:
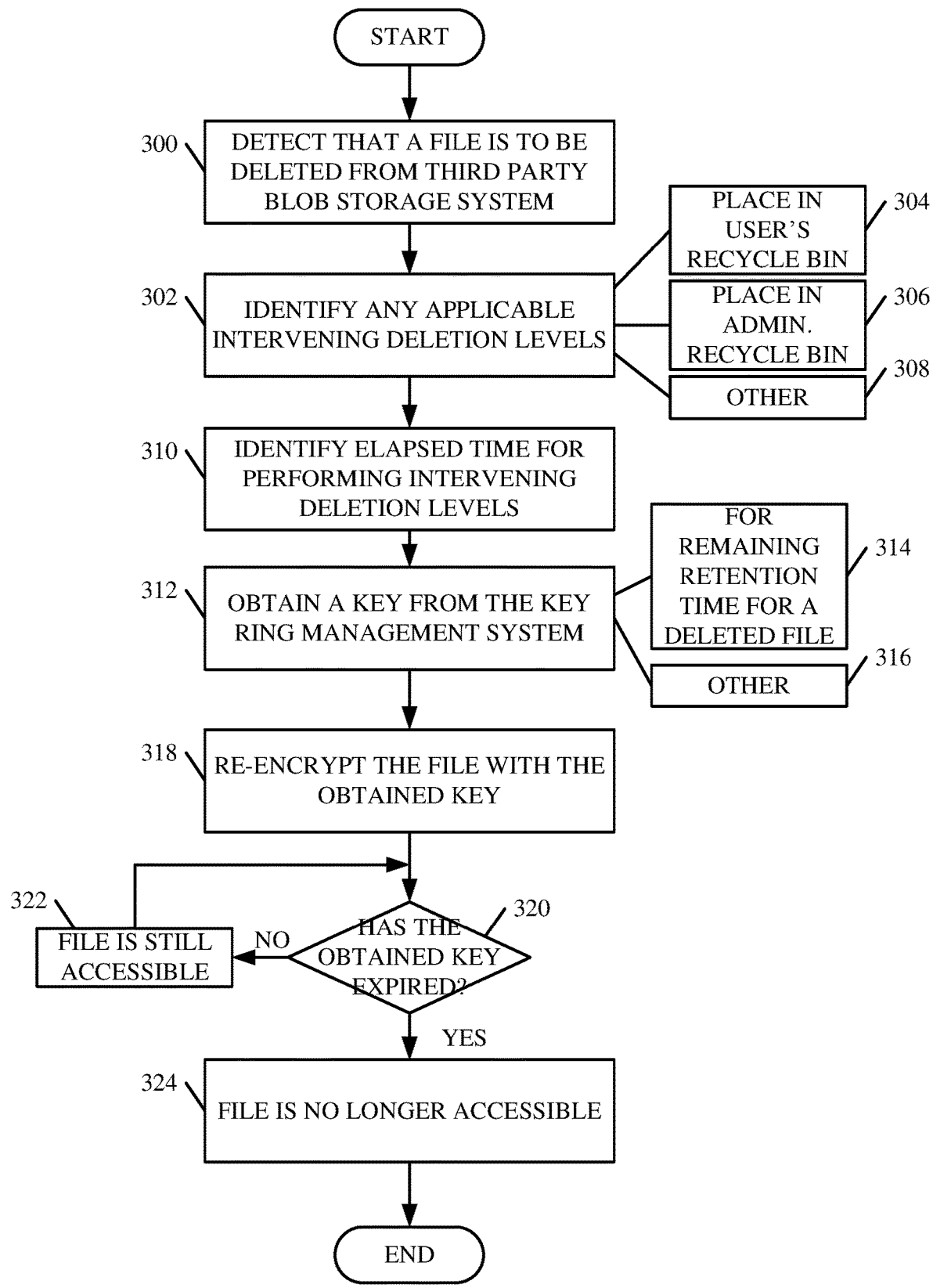
FIG. 5B is a flow diagram illustrating one example of the operation of the architecture shown in FIG. 1 in processing a file to be deleted.

FIG. 5B is a flow diagram illustrating one example of the operation of deleted file processing system 152 in processing files that have been marked for deletion from remote third party blob storage system 106. It should be noted that, in one example, architecture 100 provides a variety of different levels of deletion. For example, if a user at client 102 deletes a file, it may go to the client's recycle bin for a predefined amount of time, before it is deleted from the user's recycle bin (either automatically or by the user actively deleting it from the recycle bin). Once it is deleted from the user's recycle bin, the file can then be provided to an administrator's recycle bin, in case the user later decides that he or she wishes to recover the file again. It may remain in the administrator's recycle bin for a predetermined amount of time, unless the administrator actively deletes it from his or her recycle bin.

In one example, in accordance with the scenario described with respect to FIG. 5B, architecture 100 provides an additional level of deletion processing. This can be performed by deleted file processing system 152. This processing can also be used to ensure client 102 that, after a file is deleted by a user, and after a predetermined amount of time has elapsed, the file will actually be deleted from remote third party blob storage system 106 (and any backup storage systems 108 where it is stored), and will no longer be accessible.

Deleted file processing system 152 first detects that a file is to be deleted from third party blob storage system 106. This is indicated by block 300 in FIG. 5. For instance, it may be that a user at client 102 has indicated that a file is to be deleted. In another example, it may be that the administrator of local computing system 104 has indicated that a file is to be deleted from his or her recycle bin. In any case, a file has been identified for deletion from third party storage system 106.

Deleted file processing system 152 then identifies any applicable intervening deletion levels that may have already occurred. This is indicated by block 302. For instance, it may be that the identified file was first placed in the user's recycle bin for a predetermined amount of time, or until the user actively deleted it from his or her recycle bin. This is indicated by block 304. It may also be that the deleted file was then placed in an administrative recycle bin where it remained for a predetermined amount of time, or until the administrator actively deleted it from his or her recycle bin. This is indicated by block 306. There may be a variety of other intervening deletion levels that had undergone processing as well, and this is indicated by block 308.

Elapsed time identifier component 326 then identifies any elapsed time that was used in performing the intervening deletion levels. This is indicated by block 310. For instance, it may be that the file was first placed in the user's recycle bin for 30 days, after which it was deleted from there and placed in the administrator's recycle bin. It may have remained in the administrator's recycle bin for an additional 10 days, after which it was deleted from there. Thus, the elapsed time that was consumed by the intervening deletion levels, in that case, would be 40 days.

It is assumed for the sake of the present discussion that remote third party blob storage system 106 has provided assurance to clients 102 that, once a file is deleted, the file will be inaccessible after a predefined period (such as 60 days). In that case, once elapsed time identifier component 326 has identified the time that was consumed in the intervening deletion levels, remaining retention time identifier component 328 identifies how much time remains before the file is to be completely inaccessible, and it obtains a corresponding key from the key ring management system 156 in key provider system 110. This is indicated by block 312.

In one example, key ring management system 156 generates a key every day and assigns that key a predetermined expiration date. For example, it may be that every key issued by key ring management system 156 has a life of 60 days, after which it expires and is no longer valid or usable to decrypt information in architecture 100. Based on the already elapsed time, and the remaining retention time, deleted file processing system 152 illustratively obtains a key from key ring management system 156 so that the key only has a remaining life corresponding to the remaining retention time for the file to be deleted. In the scenario described above, assume that the elapsed time for the intervening deletion levels is 40 days. Assume that storage system 106 has indicated that any deleted file will no longer be accessible after a period of 60 days. In that case, component 328 identifies the remaining retention time for the file to be 20 days. Therefore, deleted file processing system 152 obtains a key from key ring management system 156 that has a remaining life of 20 days. Obtaining the key for the remaining retention time for a deleted file is indicated by block 314. It can obtain the key in other ways as well, as indicated by block 316.

System 152 then re-encrypts the file to be deleted with the obtained key. This is indicated by block 318. Until that key expires, the deleted file will still be accessible by system 104. If it requests the deleted file from storage system 106, storage system 106 can use that key to decrypt the file that has been marked for deletion, and provide it, to system 104. Thus, while the key is unexpired, the file is still accessible by local computing system 104. This is indicated by blocks 320 and 322 in FIG. 5B. However, after the obtained key, with which the deleted file was re-encrypted, has expired, then the file is no longer accessible within architecture 100. This is indicated by block 324.

It can thus be seen that architecture 100 defines a storage platform that greatly enhances security of stored data. For a surreptitious user to obtain an unencrypted form of data stored on storage system 106, the surreptitious user must have access to not only the encrypted blobs 140-144 on storage system 106, but also to one or more master keys 166-168 on master key storage system 112, and to encrypted UKPB keys 126 on local computing system 104. The surreptitious user must also have knowledge of how to assemble this information and use it in order to decrypt the encrypted UKPB keys 126 and the encrypted blobs. In addition, storage system 106 can provide an indication as to the maximum retention time for a deleted file. Once that retention time is reached, the key obtained from the key ring management system 156 will expire and the deleted file will no longer be accessible within architecture 100. This can provide additional security to users of client 102, so that they know that their data, once deleted, will actually be deleted from the entire architecture, and no copies of the data will remain in any of the storage systems 106-108.

Further, the system can provide quicker response times. By requesting data from two different systems, and then using the data from the quickest responding system, fast data access times can be achieved.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
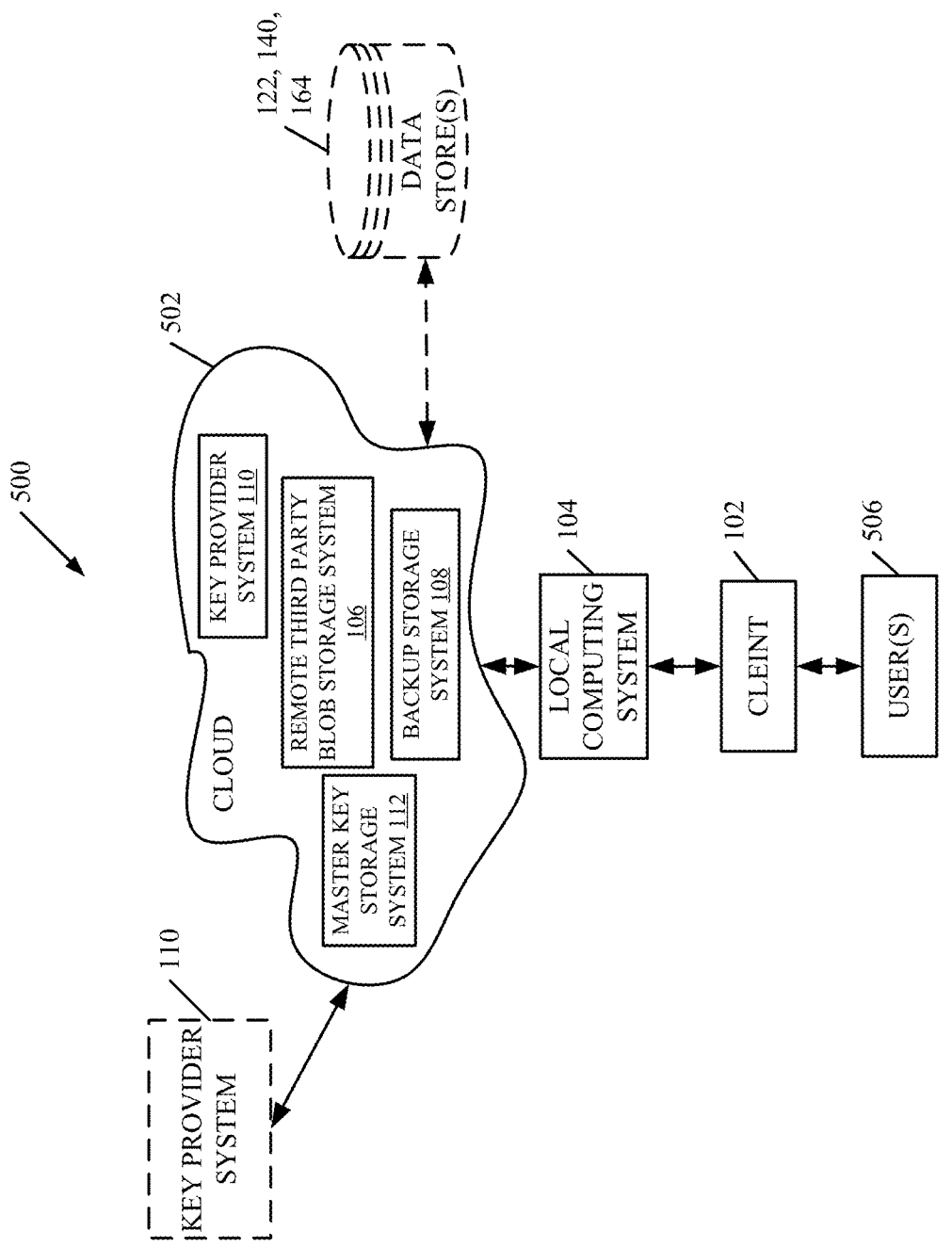
FIG. 6 is a block diagram of one example of the architecture shown in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and the applications can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that systems 106, 108, 110 and 112 can be located in cloud 502 (which can be public, private, or a combination where portions are public while others are private). Therefore, user(s) 506 use a client system 102 and local computing system 104 to access those systems through cloud 502.

FIG. 6 also depicts another example of a cloud architecture. FIG. 6 shows that it is also contemplated that some elements of architecture 100 are disposed in cloud 502 while others are not. By way of example, data stores 122, 140 and 164 can be disposed outside of cloud 502, and accessed through cloud 502. In another example, key provider system 110 (or other systems) can be outside of cloud 502. Regardless of where they are located, they can be accessed directly by system 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
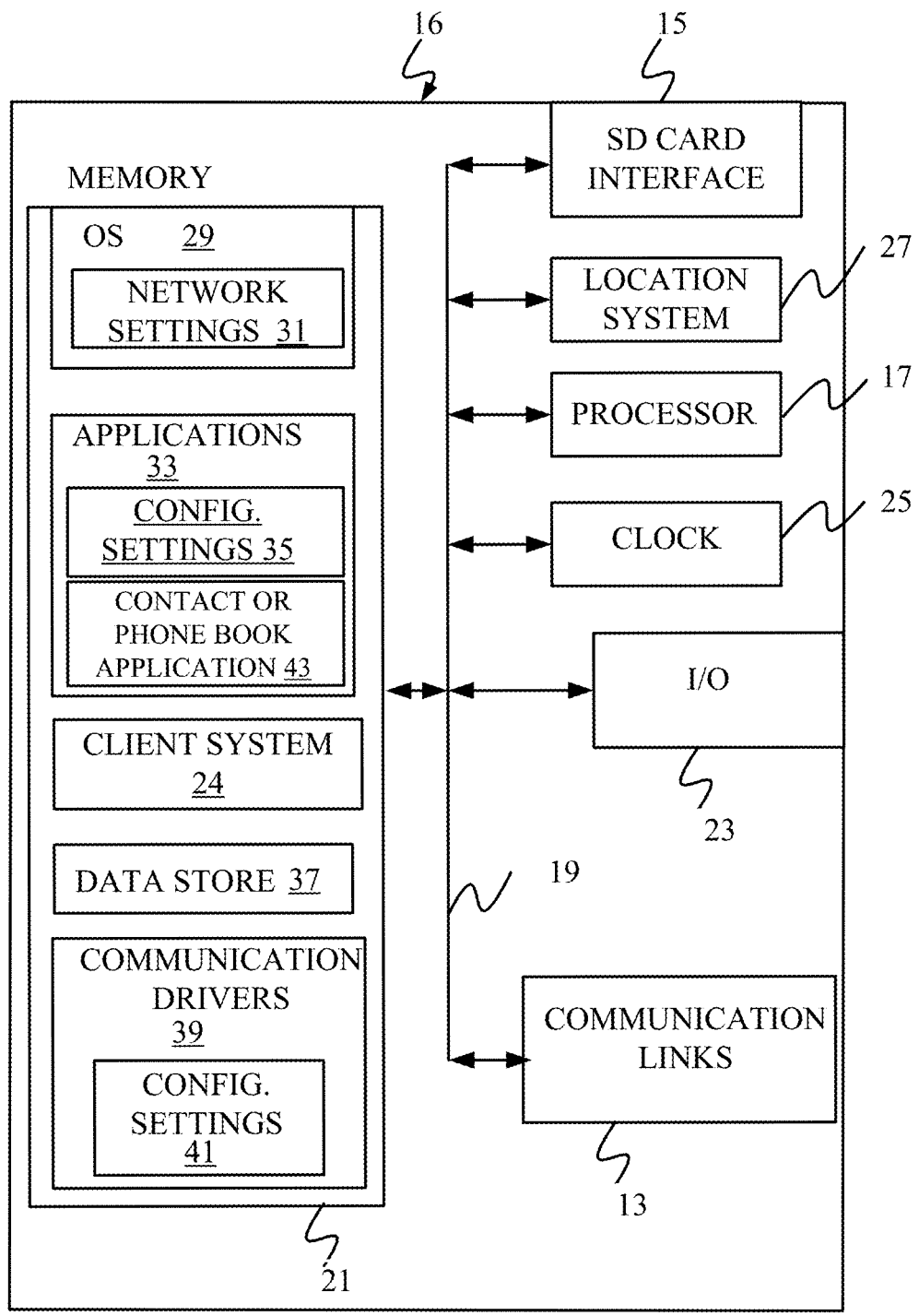
FIGS. 7-9 show examples of mobile devices that can be used in any of the architectures of the previous figures.
Figure 8:
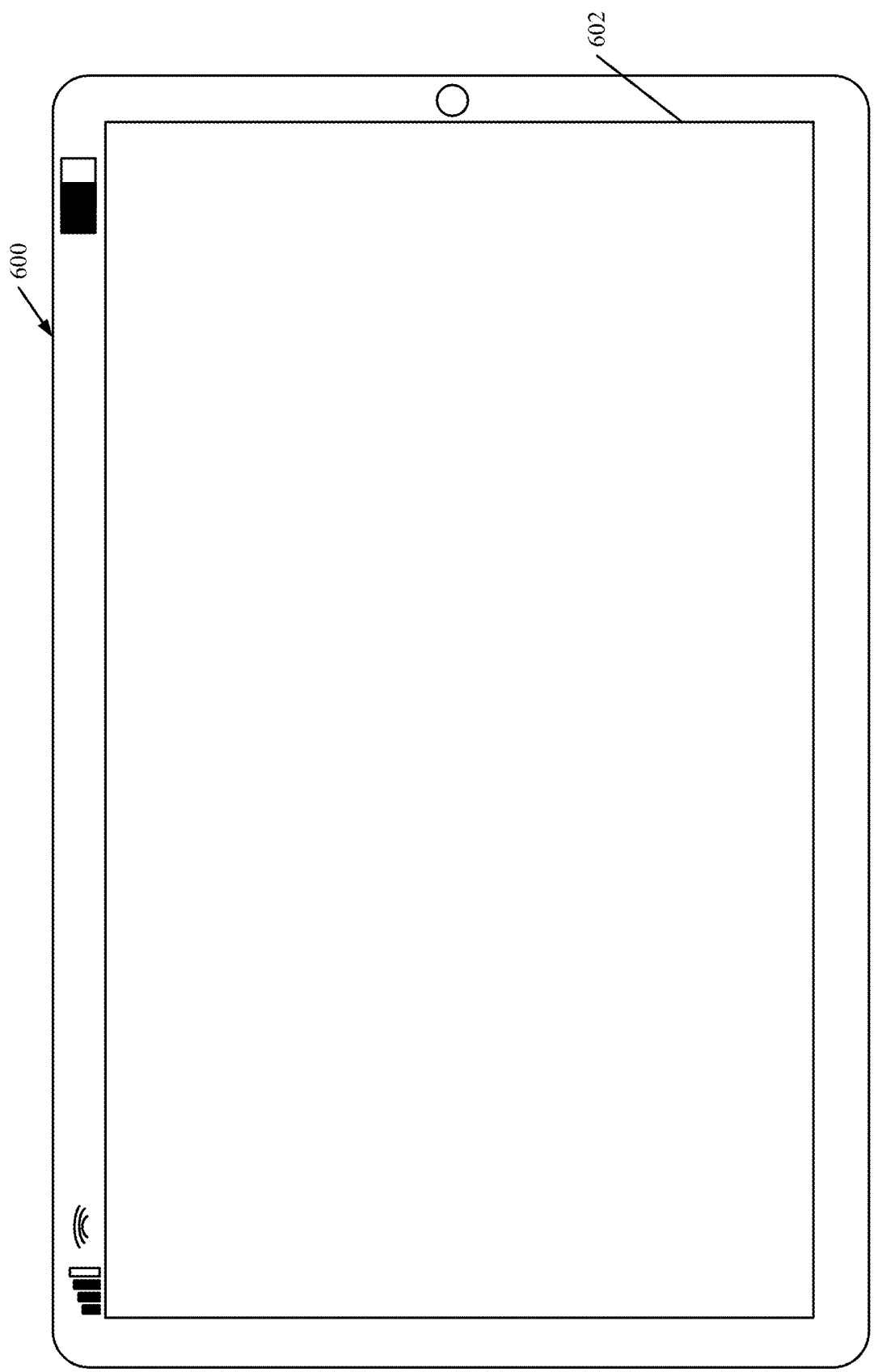
Figure 9:
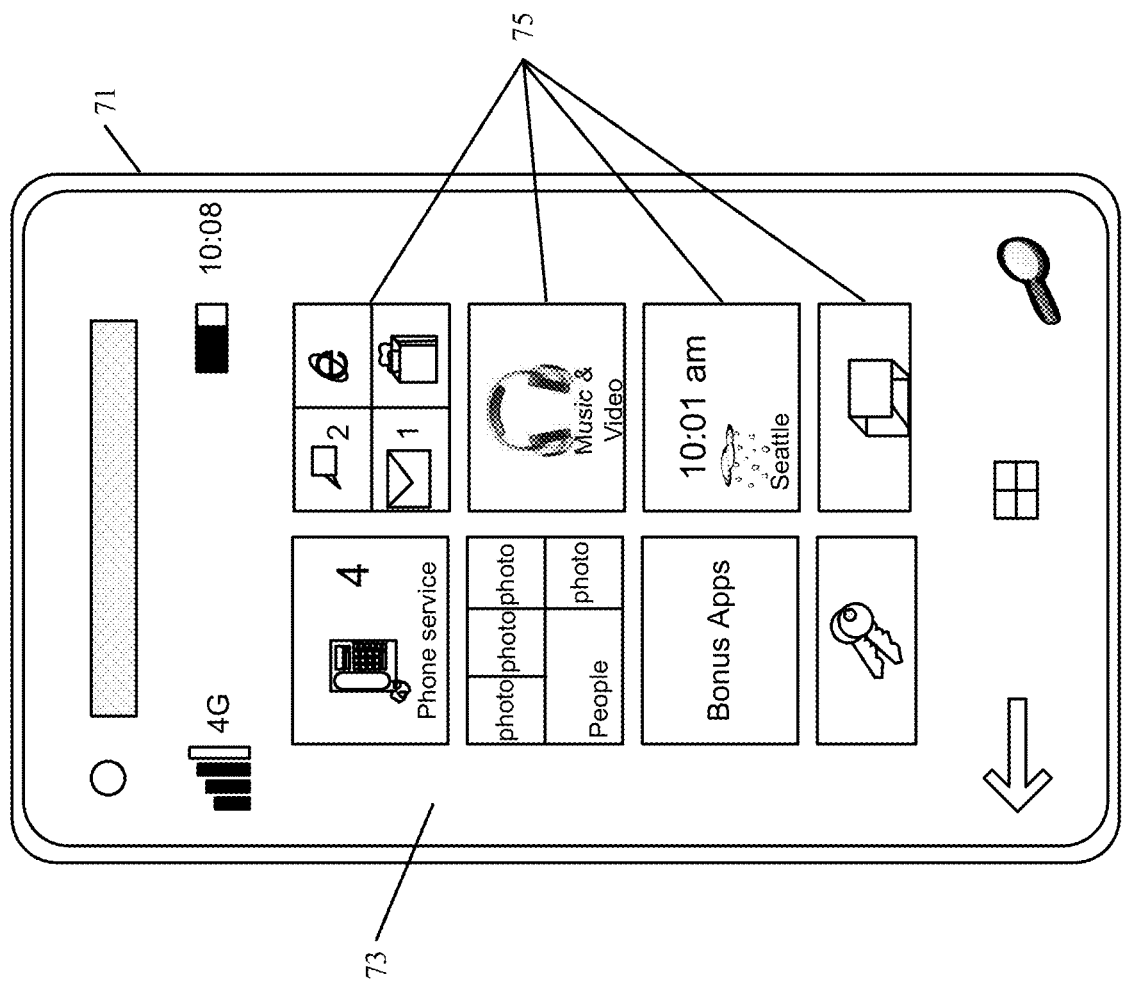

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), Long-Term Evolution (LTE), High Speed Packet Access (HSPA), HSPA+ and other 3G and 4G radio protocols, One Times Radio Transmission Technology (1×rtt), and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 120, 150, 160 or 172 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a long range navigation (LORAN) system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 9 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
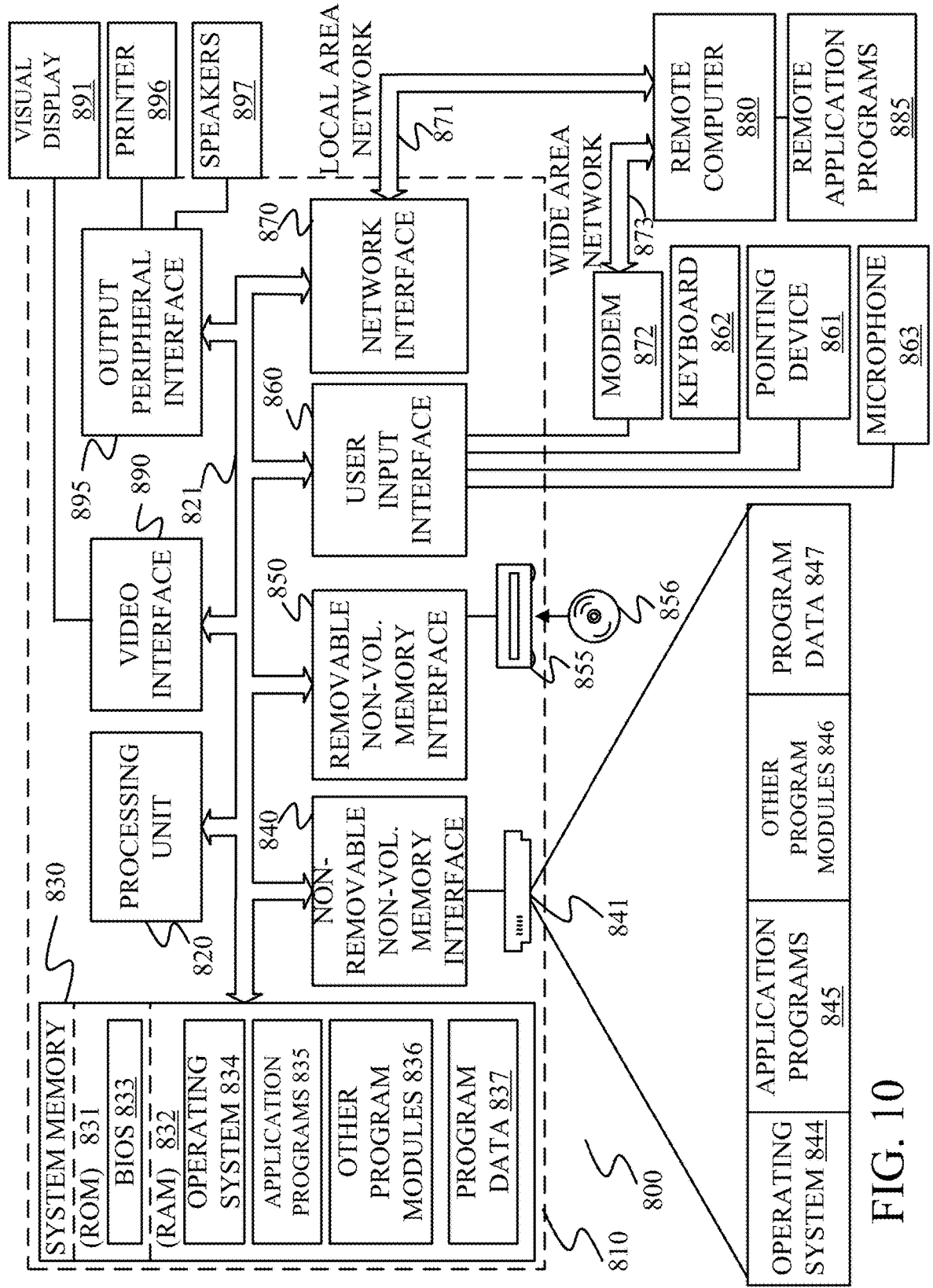
FIG. 10 is a block diagram of one example of a computing environment that can be used in any of the architectures shown in the previous figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors 120, 150, 160 or 172), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical disc storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disc drive 855 that reads from or writes to a removable, nonvolatile optical disc 856 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 841 is typically connected to the system bus 821 through a non-removable memory interface such as interface 840, and optical disc drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a communication component that receives a data file to be stored on a remote data storage system;

an encryption system that transforms the data file by encrypting the data file with a file-specific encryption key to obtain an encrypted file, the encryption system encrypting the file-specific encryption key, with a master key, to obtain an encrypted file-specific encryption key, the communication component sending the encrypted file to the remote data storage system and sending the master key to a remote master key storage system that is remote from the computing system and from the remote data storage system;

a data store, that is remote from the remote data storage system and from the master key storage system, that stores the encrypted file-specific encryption key.

Example 2 is the computing system of any or all previous examples wherein the data store is local to the computing system.

Example 3 is the computing system of any or all previous examples wherein the communication component is configured to receive a data access request for the data file and send a first data request requesting the encrypted file from the remote storage system.

Example 4 is the computing system of any or all previous examples and further comprising:

a decryption system configured to obtain the master key from the master key storage system and the encrypted file-specific encryption key from the data store, and decrypt the encrypted file-specific encryption key with the master key.

Example 5 is the computing system of any or all previous examples wherein the decryption system is configured to decrypt the encrypted data file with the file-specific encryption key.

Example 6 is the computing system of any or all previous examples and further comprising:

a shredding component that shreds the data file into blobs and wherein the encryption system encrypts the data file by encrypting each blob with a blob-specific encryption key.

Example 7 is the computing system of any or all previous examples wherein the encryption system encrypts the file-specific encryption key by encrypting the blob-specific encryption keys with at least one master key.

Example 8 is the computing system of any or all previous examples wherein the decryption system is configured to obtain the at least one master key and decrypt each blob-specific encryption key with the at least one master key and to decrypt each blob with a corresponding blob-specific encryption key.

Example 9 is the computing system of any or all previous examples wherein the communication component assembles the decrypted blobs into the data file and returns the data file in response to the data access request.

Example 10 is the computing system of any or all previous examples wherein the communication component is configured to send the encrypted data file to a backup remote storage.

Example 11 is a computing system, comprising:

an elapsed time identifier configured to receive a delete request from another computing system to delete a file saved on a data store and identify any elapsed time that elapsed during processing of previous deletion levels in a set of deletion levels in the other computing system;

a remaining retention time identifier that identifies a remaining retention time for the file based on the elapsed time; and a file encryption component that obtains an encryption key with a lifespan that corresponds to the remaining retention time for the file and that expires after the lifespan, and that transforms the file by encrypting the file with the encryption key.

Example 12 is the computing system of any or all previous examples and further comprising:

a decryption system that decrypts the file using the encryption key if recovery of the file is requested prior expiration of the encryption key.

Example 13 is a computer implemented method, comprising:

receiving a data file to be stored on a remote data storage system;

transforming the data file by encrypting the data file with a file-specific encryption key to obtain an encrypted file;

encrypting the file-specific encryption key, with a master key, to obtain an encrypted file-specific encryption key;

sending the encrypted file to the remote data storage system;

sending the master key to a remote master key storage system that is remote from the computing system and from the remote data storage system; and storing the encrypted file-specific encryption key in a data store, that is remote from the remote data storage system and from the master key storage system.

Example 14 is the computer implemented method of any or all previous examples and further comprising:

receiving a data access request for the data file; and sending a first data request requesting the encrypted file from the remote storage system based on the data access request.

Example 15 is the computer implemented method of any or all previous examples and further comprising:

obtaining the master key from the master key storage system and the encrypted file-specific encryption key from the data store; and decrypting the encrypted file-specific encryption key with the master key.

Example 16 is the computer implemented method of any or all previous examples and further comprising:

decrypting the encrypted data file with the file-specific encryption key.

Example 17 is the computer implemented method of any or all previous examples and further comprising:

prior to encrypting the data file, shredding the data file into blobs and wherein encrypting the data file comprises encrypting each blob with a blob-specific encryption key.

Example 18 is the computer implemented method of any or all previous examples wherein encrypting the file-specific encryption key comprises encrypting the blob-specific encryption keys with at least one master key.

Example 19 is the computer implemented method of any or all previous examples wherein decrypting the encrypted data file comprises:

obtaining the at least one master key;

decrypting each blob-specific encryption key with the at least one master key; and decrypting each blob with a corresponding blob-specific encryption key.

Example 20 is the computer implemented method of any or all previous examples and further comprising:

assembling the decrypted blobs into the data file; and returning the data file in response to the data access request.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system, the method comprising:

receiving a data storage request associated with a data file;

encrypting the data file using an encryption key;

encrypting the encryption key using a master key;
sending the encrypted data file over a communication network to a first remote data store that is remote from the computing system;
sending the master key over the communication network to a second remote data store that is remote from the computing system and remote from the first remote data store; and
storing the encrypted encryption key in a third data store that is:
associated with the computing system, and
remote from both the first remote data store and the second remote data store.

2. The method of claim 1, wherein the encryption key comprises a file-specific encryption key that is specific to the data file, the method further comprising:
deleting the master key from the computing system after sending the master key to the second remote data store.

3. The method of claim 1, further comprising:
based on a data access request, sending a data retrieval request to the first remote data store; and
receiving, in response to the data retrieval request, the encrypted data file from the first remote data store.

4. The method of claim 3, wherein the third data store comprises a local data store that is local to the computing system, the method further comprising:
receiving the master key from the second remote data store;
obtaining the encrypted encryption key from the local data store;
decrypting the encrypted encryption key, stored in the local data store, using the received master key; and
decrypting the received encrypted data file using the decrypted encryption key.

5. The method of claim 4, further comprising:
shredding the data file into a plurality of blobs;
generating a plurality of blob-specific encryption keys, each blob-specific encryption key being specific to a respective one of the blobs; and
encrypting each blob with the respective blob-specific encryption key that is specific to the respective one of the blobs.

6. The method of claim 5, further comprising:
encrypting each blob-specific encryption key with the master key or at least one other master key.

7. The method of claim 6, further comprising:
sending the plurality of blobs to a plurality of different remote data storage systems configured to store the blobs.

8. A computing system comprising:
at least one processor; and
memory storing instructions executable by the at least one processor, wherein the instructions, when executed, cause the computing system to:
receive a data storage request associated with a data file;
encrypt the data file using an encryption key;
encrypt the encryption key using a master key;
send the encrypted data file over a communication network to a first remote data store that is remote from the computing system;
send the master key over the communication network to a second remote data store that is remote from the computing system and remote from the first remote data store; and
store the encrypted encryption key in a third data store that is:
associated with the computing system, and
remote from both the first remote data store and the second remote data store.

9. The computing system of claim 8, wherein the encryption key comprises a file-specific encryption key that is specific to the data file, wherein the instructions, when executed, further cause the computing system to:
delete the master key from the computing system after sending the master key to the second remote data store.

10. The computing system of claim 8, wherein the instructions, when executed, further cause the computing system to:
based on a data access request, send a data retrieval request to the first remote data store; and
receive, in response to the data retrieval request, the encrypted data file from the first remote data store.

11. The computing system of claim 10, wherein the third data store comprises a local data store that is local to the computing system, wherein the instructions, when executed, further cause the computing system to:
receive the master key from the second remote data store;
obtain the encrypted encryption key from the local data store;
decrypt the encrypted encryption key, stored in the local data store, using the received master key; and
decrypt the received encrypted data file using the decrypted encryption key.

12. The computing system of claim 11, wherein the instructions, when executed, further cause the computing system to:
shred the data file into a plurality of blobs;
generate a plurality of blob-specific encryption keys, each blob-specific encryption key being specific to a respective one of the blobs; and
encrypt each blob with the respective blob-specific encryption key that is specific to the respective one of the blobs.

13. The computing system of claim 12, wherein the instructions, when executed, further cause the computing system to:
encrypt each blob-specific encryption key with the master key or at least one other master key.

14. The computing system of claim 13, wherein the instructions, when executed, further cause the computing system to:
send the plurality of blobs to a plurality of different remote data storage systems configured to store the blobs.

* * * * *